Patented Mar. 9, 1943

2,313,276

UNITED STATES PATENT OFFICE 2,313,276

METHOD OF MAKING IRON PHYTATE

Herman H. Schopmeyer, Hammond, Ind., and Gordon V. Sharps, Chicago, Ill., assignors to American Maize-Products Company, a corporation of Maine No Drawing. Application June 26, 1941, Serial No. 399,958

4 Claims. (Cl. 260—439)

This invention relates to an iron compound of phytin and the method of making it. The invention relates more particularly to making the compound under such conditions that it is formed readily, with a good yield, and so that insoluble iron present is contained practically entirely in the form of an organic compound that fails to show a positive test for iron with tannic acid.

Certain cereals such as corn, rye, or wheat contain water-soluble salts of inositolhexaphosphoric acid that may be referred to as phytin or water-soluble phytin derivatives. In making iron compounds of the phytin, compounds that for convenience are called iron phytate, iron phytate is precipitated by the addition of a ferric salt to a solution of the phytin.

We have now found that, in using corn steep water as a source of phytin and making the precipitation at a pH of about 2.2 to 3.3, we obtain rapid precipitation of the iron phytate, a precipitate of better color, and at the same time a product that is less contaminated by other insoluble inorganic iron compounds than when the precipitation is effected at any other pH.

Briefly stated, the invention comprises treating an aqueous phytin-containing extract of corn with lime or the like to precipitate the phytin, dissolving the precipitate in an aqueous solution of an acid, separating the dissolved phytin material, as by filtration, from insoluble material that may have been formed on the addition of lime, and then adding to the separated phytin solution a soluble ferric compound while maintaining the pH at a value between about 2.2 and 3.3. In the preferred embodiment, the invention comprises washing the resulting precipitated iron phytate to remove water-soluble iron compounds and then drying the washed product, the pH during washing and drying being maintained on the acid side and to advantage within the range 2.2 to 3.3 during washing.

When the pH value at the time of the precipitation of iron phytate is maintained at about 2.2 to 3.3, the iron phytate forms promptly on the addition of the soluble iron salt and within a short time the iron phytate is precipitated with an excellent yield. Furthermore, the iron phytate so obtained is substantially free from contaminating insoluble iron compounds, both organic and inorganic. When the pH at the time of precipitation is either substantially above or below the range stated, objectionable contamination of the precipitate by some colored substance or substance result. Even less discoloration is obtained when the pH is between 2.5 and 3, although a pH as low as 2.2 or as high as 3.3 is satisfactory for most purposes. At pH's substantially below 2.2 the yield of the iron phytate decreases also.

In establishing the pH, the amount of acid to be added can not be calculated accurately in advance, because of the varying extent of buffer action of compounds present in unlike proportions in steep water from different factories. The acid should be added until the pH by actual determination is that specified.

In carrying out the invention, corn steep water is formed in any usual manner, as by the extraction of corn with water at about 120° to 130° F., the water used in the steeping containing about 0.1% to 0.25% of sulfur dioxide. After the steep water is separated from the corn the phytin is precipitated by adding any metal compound adapted to precipitate phytin, as, for example, an appreciably soluble compound of calcium, magnesium, or strontium. Calcium compounds are preferred.

For the precipitation, the pH is established at 5 to 7.5 and for best results at about 6 to 6.5. Further increase of the pH leads to little additional precipitation. While calcium chloride and dilute sodium hydroxide solution may be added to provide the calcium ion for precipitation and establish the pH, it is simpler and more satisfactory to add lime alone in amount to neutralize most of the acidity present in the steep water, establish the pH in the range stated, and convert the phytin to insoluble form. By discontinuing the addition of lime when the pH reaches approximately 6.5, there is prevented precipitation of certain protein materials that, if precipitated, would lead to additional contamination of the precipitate of calcium phytate.

The calcium phytate and the material associated therewith, particularly certain proteins or protein derivatives, are then treated with an acid to dissolve the precipitated calcium phytate while leaving as much as feasible of the other materials undissolved. For this purpose there is used an acid whose ferric salt is soluble in water. Thus, there may be used to advantage dilute hydrochloric acid, sulfuric acid, or sulfurous acid in amount to establish the pH at a value not substantially higher than 3.3 and suitably within the range of about 2.2 to 3.3 and preferably 2.5 to 3. With an aqueous solution of such a pH the precipitated salts of phytic acid are dissolved with a minimum proportion of contaminating materials. At a pH much above 3 the phytic acid salts do not dissolve. With a pH much on the acid side of 2.5, there is dissolved an unnecessarily large amount of contaminating substances that if present in the solution of phytin, may lead to contamination to an objectionable extent of the iron phytate subsequently precipitated.

To the acid solution of the phytin made as described, there is then added an aqueous solution of a soluble ferric salt, as, for example, ferric chloride, ferric sulfate or ferric acetate, the pH of the solution before the addition of the iron salt and of the iron salt solution itself being so adjusted that when the two solutions are mixed the pH is within the range of approximately 2.2 to 3.3 and preferably 2.5 to 3. Under such conditions, there is formed readily a precipitate of iron phytate.

The precipitate is washed free of iron salt with water or preferably with an acid solution such as one containing one of the acids stated above and at about the pH used during the precipitation, the salt washed out being soluble.

The washed precipitate is then dried, say by being maintained for a moderate period of time at about 150 to 212° F. in contact with a current of air or in a flash dryer of conventional type suitable for handling a wet sludge.

In a typical example of the practice of the invention, the various materials were used in the following proportions, proportions here and elsewhere herein being expressed as parts by weight.

Corn steep water in the amount of 5,000 parts on the dry basis was treated with 385 parts of hydrated lime. The resulting pH of the mixture was 6.5.

The treatment was made at 120° F. and the resulting precipitate was separated from the remaining liquor by filtration in a plate and frame pressure filter. The filter cakes were washed with water until substantially free from water-soluble materials.

The filter press was then opened and the filter cake suspended in about 6 times its weight of water containing hydrochloric acid in amount to establish the pH at 2.8. After agitation for a short period of time, the mixture was then subjected to a second filtration and the insoluble material in the filter washed with an aqueous hydrochloric acid solution of pH about 2.8.

The filtrate containing the dissolved phytin material was then mixed with an aqueous solution of ferric chloride including hydrochloric acid in amount to establish at approximately 3 the pH of the mixed solutions. The amount of iron chloride added in this typical operation was 525 parts.

After the iron solution had been added to the phytin solution for a period of about 1 hour, the resulting precipitate of iron phytate was filtered, washed, and dried in a stream of air at about 160° F., the material during washing and drying being maintained moderately acid and suitably at a pH below 5.

There was thus obtained 843 parts of the dried iron phytate.

The product so made is stable and the iron contained in it is so firmly held that the product when suspended in water and treated with tannic acid gives no reaction for iron.

It will be noted that the mineral acid selected is one whose salt with the alkaline earth metal compound used is water soluble and the ferric salt used is one whose non-metallic part, that is, the anion, forms a water soluble salt with the same alkaline earth metal.

Because of the low iron ion concentration given when our product is treated with water and its high degree of purity, our iron phytate is particularly desirable for use in products where a high proportion of iron is desired without the properties given by iron ions. Thus the product is suitable as an admixture in flour, as it gives fortification with iron without introducing any substantial proportion of ionizable iron compound or objectionable coloring.

It will be understood that the details given are for the purpose of illustration and that variations therefrom may be made provided the pH at the time of precipitation of the iron phytate is made approximately 2.2 to 3.3.

What we claim is:

1. In making iron phytate, the method which comprises extracting corn with water to produce steep water containing a water-soluble phytin derivative, adding an alkaline earth metal compound serving to convert the said derivative to insoluble phytate, separating the precipitated phytate from remaining liquid, dissolving the separated phytate in dilute acid forming a water soluble salt with the metal of the alkaline earth metal compound, establishing the pH at about 2.2 to 3.3, and adding a water-soluble ferric salt, so that iron phytate is precipitated readily and in form containing insoluble iron substantially exclusively in the form of an iron organic compound, the ferric salt added being one the non-metallic part of which forms a water soluble salt with the metal of the said alkaline earth metal compound.

2. In making iron phytate, the method which comprises extracting corn with water to produce corn steep water, adding to the steep water a soluble compound of calcium and establishing the pH at a value of approximately 5 to 7.5, so as to precipitate calcium phytate from the steep water, separating the calcium phytate from the remaining liquid, dissolving the separated phytate in water containing added mineral acid, adjusting the pH to about 2.2 to 3.3, and adding a water-soluble ferric salt so as to cause precipitation of iron phytate at a pH of about 2.2 to 3.3, the ferric salt added being one the non-metallic part of which forms a water soluble salt with calcium.

3. The method described in claim 2, including washing the precipitated iron phytate with an aqueous solution of an acid at a pH of about 2.2 to 3.3 and subjecting the washed product to drying at a moderately elevated temperature, the product during drying being maintained at a pH below 5.

4. The method described in claim 2, the pH at the time of the precipitation of iron phytate being maintained at 2.5 to 3.

HERMAN H. SCHOPMEYER.
GORDON V. SHARPS.